United States Patent [19]

Linn et al.

[11] 3,833,099

[45] Sept. 3, 1974

[54] SEALED OIL FILLED CLUTCH WITH BRAKE MEANS TO INHIBIT ROTATION UPON DISENGAGEMENT

[75] Inventors: Donald F. Linn, Manlius; Carl D. Bush, Solvay; Frederick P. Taylor, Bridgeport, all of N.Y.

[73] Assignee: Like-Rollway Corporation, Syracuse, N.Y.

[22] Filed: Feb. 5, 1973

[21] Appl. No.: 329,636

[52] U.S. Cl. ............................ 192/13 R, 192/18 R
[51] Int. Cl. .......................................... F16d 67/02
[58] Field of Search .............. 192/13 R, 18 R, 18 A

[56] References Cited
UNITED STATES PATENTS

| | | | |
|---|---|---|---|
| 2,863,537 | 12/1958 | Root | 192/18 R |
| 3,179,217 | 4/1965 | Root | 192/13 R |
| 3,432,014 | 3/1969 | Iwamatsu et al. | 192/18 R |
| 3,540,557 | 11/1970 | Hasselbacher et al. | 192/18 A |
| 3,645,367 | 2/1973 | Coleman et al. | 192/13 R |
| 3,722,643 | 3/1973 | Kempf et al. | 192/13 R |

*Primary Examiner*—Samuel Scott
*Assistant Examiner*—Allan Russell Burke
*Attorney, Agent, or Firm*—Bruns & Jenney

[57] ABSTRACT

A brake is disposed within a rotating oil tight assembly of a heavy duty friction clutch. The brake has friction surfaces which engage to inhibit the rotation of a driven shaft upon disengagement of the clutch.

1 Claim, 1 Drawing Figure

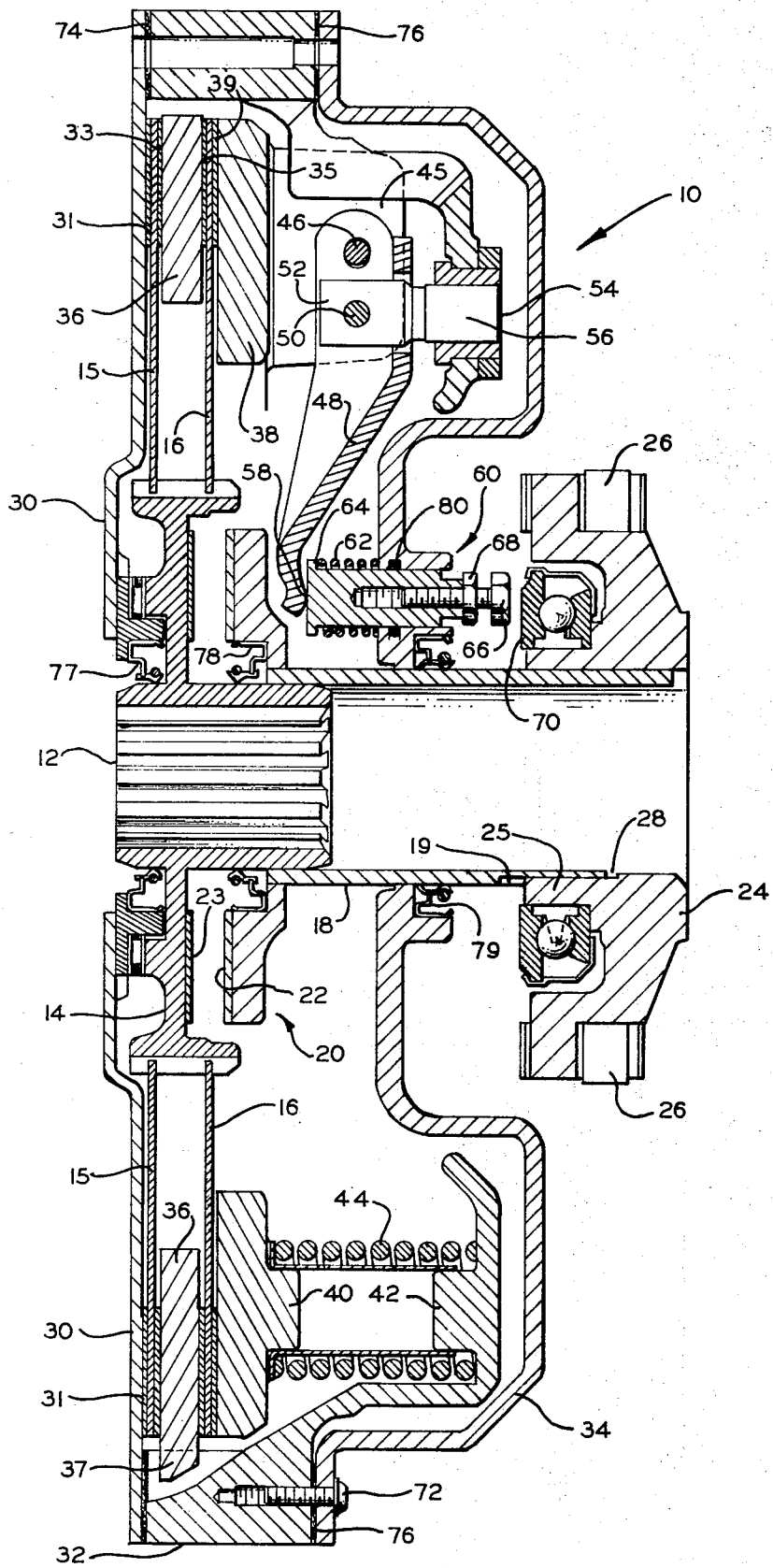

SEALED OIL FILLED CLUTCH WITH BRAKE MEANS TO INHIBIT ROTATION UPON DISENGAGEMENT

BACKGROUND OF THE INVENTION

This invention relates generally to the transmission of rotary power in heavy duty vehicles, and has particular reference to a novel friction clutch construction.

In a heavy duty vehicle, such as a truck or a tractor, a friction clutch normally couples power from the flywheel of an engine to a driven shaft.

The clutch usually includes a pressure plate which is operably connected to the flywheel. When the clutch is engaged, friction faces on opposite sides of a driven disc are frictionally engaged with friction faces on the flywheel and the pressure plate, respectively, thereby transmitting torque from the flywheel to the disc. The disc is usually connected to a hub mounted on the driven shaft whereby engagement of the clutch causes the application of torque from the engine to the shaft.

The useful life of a clutch is substantially increased by sealing the clutch in oil. The oil forms a thin layer between the friction faces thereby substantially eliminating wear due to the frictional engagement thereof. The inventions of Root disclosed in U.S. Pat. Nos. 2,796,964 and 3,179,217 are exemplary of clutches of this type.

In a sealed oil filled clutch, the oil rotates with the pressure plate and the flywheel thereby tending to rotate the disc and its hub when the clutch is not engaged. Accordingly, immediately after the disengagement of the clutch, the oil tends to prolong the rotation of the shaft. Typically, retarding devices are coupled to the shaft to inhibit the rotation when the clutch is disengaged.

Friction brakes which are responsive to the disengagement of the clutch have been used to inhibit the rotation of the shaft. In sealed oil clutches, the brakes have heretofore been provided external to the oil seal and have substantially enlarged the size of the clutch. Additionally, the friction surfaces of the brake tend to wear, thereby shortening the life of the clutch.

SUMMARY OF THE INVENTION

An object of the present invention is to provide a clutch where the rotation of the hub is stopped substantially concurrently with the disengagement of the clutch.

Another object of the present invention is to provide a clutch wherein wear on members that are frictionally engaged is reduced to a minimum.

According to the present invention, within a sealed clutch filled with a fluid, opposed friction surfaces connected to a flange on a hub and a non-rotating member, respectively, frictionally engage in response to the disengagement of the clutch.

Clutches constructed according to the present invention are relatively small in size and have friction brakes with a fluid between the friction surfaces thereof. The fluid substantially eliminates wear due to the frictional engagement of the friction surfaces.

Other objects, features and advantages of the present invention will become more apparent in the light of the following detailed description of the preferred embodiment thereof as illustrated in the accompanying drawing.

BRIEF DESCRIPTION OF THE DRAWING

The sole FIGURE herein is an axial sectional view of a preferred embodiment of the present invention.

DESCRIPTION OF THE PREFERRED EMBODIMENT

Referring now to the drawing, a sealed oil clutch assembly 10 includes a centrally splined hub 12 with a flange 14. A pair of friction discs 15, 16 each have a central opening through which they are received on the flange 14 for longitudinal movement (without rotation) with respect to the hub 12. Therefore, the hub 12 rotates in response to the rotation of the discs 15, 16, and the hub in turn drives the output or driven shaft (not shown).

Mounted for longitudinal movement on the hub 12 is a sleeve 18 which is welded, or connected in any other suitable manner, to an annular brake disc 20 whereon a friction surface 22 is mounted. Opposite the surface 22, a friction surface 23 is mounted on the flange 14. The sleeve 18 has mounted for longitudinal movement thereon a release bearing housing 24. Sleeve 18 has a keyway 19 which receives a key 25 on the housing 24 thereby preventing rotation of the sleeve with respect to the housing. Housing 24 is engaged by a rockable yoke 26 which is not rotatable whereby the sleeve 18 and the housing 24 may move longitudinally with respect to the hub 12 but are held againt rotation.

In this embodiment, the housing 24 is longitudinally advanced towards, or withdrawn away from, the hub 12 in response to a corresponding motion of the yoke 26. As explained hereinafter, when the yoke 26 advances the housing 24 past an overtravel gap 28, the clutch 10 is disengaged and the surfaces 22, 23 frictionally engage whereby the hub 12 is inhibited from rotating.

Torque from an engine to the hub 12 is provided via an annular rotating oil tight assembly comprised of an annular flywheel plate 30 having an interior friction surface 31. The flywheel plate 30 is fixedly connected to one side of an annular cover assembley 32 and an annular oil cover 34 is fixedly connected to the other side. The flywheel plate 30, cover assembly 32 and oil cover 34 are all disposed in axial alignment with the hub 12 and form the rotating assembly which is substantially filled with oil. The oil tight connection of the cover assembly 32 to the flywheel plate 30 and oil cover 34 is described more fully hereinafter. It should be understood that with respect to the rotating assembly, the sleeve 18 extends from the inside to the outside thereof with the bearing housing 24 being on the outside.

Within the rotating assembly, either the driven discs 15, 16 are frictionally engaged to drive the hub 12, or the brake surfaces 22, 23 are frictionally engaged to inhibit the rotation of the hub 12. According to the present invention, oil within the rotating assembly substantially eliminates the wear on all of the friction surfaces therein.

Disposed between the discs 15 and 16 in axial alignment with the hub 12 is an annular intermediate drive plate 36 which has friction surfaces 33, 35 on opposite faces thereof. A plurality of lugs 37 extend radially outwardly from the plate 36 and mate with notches in the cover assembly 32. Therefore, plate 36 rotates with the rotating assembly and at the same time is longitudinally movable with respect to the hub 12.

Disposed in axial alignment with the hub 12 is an annular pressure plate 38 which has a friction surface on a face 39 opposite the disc 16. Plate 38 has a plurality of bosses 40 which are disposed opposite corresponding bosses 42 on the cover assembly 32. The opposing bosses 40, 42 carry a plurality of springs 44 in compression thereby urging the friction surfaces of the disc 16 into frictional engagement with the friction surfaces 35, 39, respectively, and the friction surfaces of the disc 15 into frictional engagement with the friction surfaces 31, 33, respectively. When the discs 15, 16 are frictionally engaged, torque is provided from the engine to the hub 12.

The pressure plate 38 has a plurality of pairs of rearwardly projecting spaced lugs 45, and positioned between each pair is the outer end of a channel shaped release lever 48, the lever being pivotally connected to the spaced lugs by a pivot pin 46. Each release lever 48 is also pivotally connected by a pin 50 to the squared head 52 of an eyebolt 54. The eyebolts 54 are respectively screwed into threaded holes 56 in the cover assembly 32.

When the inner ends 58 of the levers 48 are moved towards the flywheel, levers 48 rotate about the fulcrum pins 50 whereby the pressure plate 38 is moved away from the disc 16. The movement of the pressure plate 38 away from the disc 16 causes the disengagement of the discs 15, 16 from the plates 30, 36 and 38 whereby the clutch is disengaged.

The end 58 of each release lever is engaged by the inner end of a release plunger assembly 60 slidably mounted in a corresponding hole in the coil cover 34. A compression spring 62 is mounted on each plunger 60 between a flange 64 on the inner end thereof and the inside surface of the oil cover 34 whereby the plunger is urged into contact with the end 58 of its corresponding release lever.

Each plunger assembly 60 further comprises a bolt 66 which is held by a lock nut 68 in a threaded hole in the plunger. When the yoke 26 causes the release bearing housing 24 to move past the gap 28, a bearing raceway 70 in the release bearing housing 24 bears against the heads of the bolts 66 thereby moving the plungers 60 further into the rotating assembly. When the plungers 60 are moved into the assembly, they move the inner ends 58 of the release levers towards the flywheel whereby the clutch is disengaged as described hereinbefore. Bolts 66 can be periodically adjusted axially to compensate for wear on the bolt heads and on the raceway 70.

Since the movement of the release bearing housing 24 past the gap 28 concurrently causes the disengagement of the clutch 10 and the frictional engagement of the brake surfaces 22, 23, the disengagement of the clutch 10 is concurrent with inhibiting the rotation of the hub 12. The sealed oil clutch also includes a plurality of bolts 72 which connect the cover assembly 32 to the oil cover 34. Washers 74, 76 of silastic material are respectively provided between the flywheel plate 30 and the cover assembly 32 and between the cover assembly 32 and the oil cover 34 to retain oil within the rotating assembly. Similarly, oil seals 77-79 and O-rings 80, all elements well-known in the art, prevent oil from escaping from between relatively movable parts of the assembly 10.

It should be understood that although the clutch 10 described hereinbefore contains oil, it may alternatively contain any other suitable fluid.

It should also be understood that alternative embodiments of the present invention may have one driven friction disc and not utilize an intermediate drive plate whereby the friction disc frictionally engages the pressure plate and the flywheel plate. Still other embodiments may include a plurality of intermediate plates and a correspondingly increased number of friction discs.

Thus, there has been shown a sealed oil clutch wherein an internal brake inhibits the rotation of the hub concurrently with the disengagement of the clutch.

Although the invention has been shown and described with respect to a preferred embodiment thereof, it should be understood by those skilled in the art that various changes and omissions in the form and detail thereof may be made therein without departing from the spirit and the scope of the invention.

We claim:

1. In a clutch which includes an annular, rotating, oil-tight assembly adapted for connection to the flywheel of an engine, a hub mounted for rotation within said assembly, an annular flange extending outwardly from said hub in a plane normal to the axis thereof, said flange having a rim at the circumference thereof, and a friction disc mounted on said rim for axial movement with respect to said hub and urged toward frictional engagement with said rotating assembly; the improvement comprising a first friction surface on said flange; a second friction surface within said rotating assembly and movable into and out of frictional engagement with said first frictional surface; a single longitudinally movable sleeve extending from the outside to the inside of the rotating assembly, the inner end of said sleeve slidably receiving a portion of said hub; a flange extending outwardly from the inner end of said sleeve in a plane normal to the axis of the hub, said second friction surface being on said last-named flange; and disengagement means operable to concurrently disengage said friction disc from frictional engagement with said rotating assembly and to frictionally engage said first and second friction surfaces whereby rotation of said hub is inhibited; said disengagement means comprising an axially adjustable release plunger mounted for longitudinal movement on said rotating assembly, a release lever operable in response to movement of said release plunger to effect the disengagement of said friction disc from said rotating assembly, and a release bearing housing mounted on said longitudinally movable sleeve outside the rotating assembly, said bearing housing being operable to simultaneously move the release plunger and sleeve whereby said second friction surface at the inner end of the sleeve is engaged with said first friction surface, and means for holding said bearing housing, sleeve and second friction surface against rotation.

* * * * *

UNITED STATES PATENT OFFICE
CERTIFICATE OF CORRECTION

Patent No. 3,833,099          Dated September 3, 1974

Inventor(s) Donald F. Linn, et al

It is certified that error appears in the above-identified patent and that said Letters Patent are hereby corrected as shown below:

On the first page Item (73) Assignee should read

-- Lipe-Rollway Corporation --

Signed and sealed this 26th day of November 1974.

(SEAL)
Attest:

McCOY M. GIBSON JR.
Attesting Officer

C. MARSHALL DANN
Commissioner of Patents